United States Patent
Hong et al.

(10) Patent No.: US 7,315,492 B2
(45) Date of Patent: *Jan. 1, 2008

(54) HEADER MASK SIGNAL GENERATING TRACK JUMP METHOD FOR A RECORDING MEDIUM

(75) Inventors: Seong Pyo Hong, Seoul (KR); Sang On Park, Kyonggi-do (KR); Hyung Jin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/313,685

(22) Filed: Dec. 22, 2005

(65) Prior Publication Data

US 2006/0098539 A1    May 11, 2006

Related U.S. Application Data

(63) Continuation of application No. 09/617,088, filed on Jul. 14, 2000, now Pat. No. 7,012,861.

(30) Foreign Application Priority Data

| Jul. 16, 1999 | (KR) | ................................ | 1999/28978 |
| Jul. 16, 1999 | (KR) | ................................ | 1999/28979 |
| Jul. 16, 1999 | (KR) | ................................ | 1999/28980 |

(51) Int. Cl.
  *G11B 7/08* (2006.01)
(52) U.S. Cl. ................. 369/44.28; 369/30.12
(58) Field of Classification Search ...... None
  See application file for complete search history.

(56) References Cited

U.S. PATENT DOCUMENTS 5,001,695 A * 3/1991 Tominaga ................ 369/44.26

(Continued)

FOREIGN PATENT DOCUMENTS

| JP | 1-217732 A | 8/1998 |
| JP | 11-66563 A | 3/1999 |

*Primary Examiner*—Andrea Wellington
*Assistant Examiner*—Michael V Battaglia
(74) *Attorney, Agent, or Firm*—Birch, Stewart, Kolasch & Birch, LLP

(57) ABSTRACT

A track jump method for an optical recording/reproducing medium is provided. In the track jump method, once a track jump command is input, a track jump operation is held until a falling edge of a header mask signal is detected. The track jump starts at the falling edge of the header mask signal and ends before a rising edge of the header mask signal so that a TZC signal is not influenced by a header during the track jump. Therefore, the track jump can be exactly and stably performed. In particular, when the track jump command is input, a PLL of a wobble signal is inhibited, and a PLL-wobble signal is held to a previous value obtained before the track jump is performed, during the track jump, or a header mask signal is generated using a read channel signal which is not influenced by a wobble period, until a wobble signal becomes stable after a trackjump. During a normal servo, a header mask signal is generated using a PLL-wobble signal to mask a header area. Therefore, a header area coming first after the trackjump is completed can be stably masked, thereby preventing a system from being unstable due to a header during the track jump.

9 Claims, 11 Drawing Sheets

U.S. PATENT DOCUMENTS

| | | |
|---|---|---|
| 5,121,372 A | 6/1992 | Tominaga |
| 5,210,726 A | 5/1993 | Jackson et al. |
| 5,315,567 A | 5/1994 | Fuji et al. |
| 5,444,682 A * | 8/1995 | Yamada et al. ............ 369/30.1 |
| 5,471,444 A | 11/1995 | Wachi |
| 5,793,715 A | 8/1998 | Alon et al. |
| 6,088,307 A | 7/2000 | Fushimi et al. |
| 6,172,952 B1 * | 1/2001 | Inokuchi et al. ......... 369/47.55 |
| 6,208,603 B1 | 3/2001 | Ishida et al. |
| 6,333,902 B1 * | 12/2001 | Shim ....................... 369/47.54 |

* cited by examiner

HEADER MASK SIGNAL GENERATING TRACK JUMP METHOD FOR A RECORDING MEDIUM

This application is a Continuation of application Ser. No. 09/617,088, filed on Jul. 14, 2000 now U.S. Pat. No. 7,012,861, the entire contents of which are hereby incorporated by reference.

BACKGROUND OF THE INVENTION

1. Field of the Invention

The present invention relates to a track jump on an optical recording and reproducing medium, and more particularly, to a method of performing a trackjump without being influenced by a header.

2. Description of the Related Art

Generally, an optical recording medium system, i.e., an optical recording and reproducing apparatus, employs an optical disc as a recording medium and reproduces data recorded on the disc or records data on the disc.

A tracking servo in the optical recording and reproducing apparatus detects a tracking error signal corresponding to a beam tracing state and shifts an objective lens and the body of an optical pickup based on the signal to modify the location of a beam and follow up a predetermined track.

At this time, a track jump is essential to a time search or a variable bit rate (VBR) operation. When the number of tracks to be jumped is small, a track is searched for using a tracking actuator.

FIG. 1 is a block diagram of a typical optical recording/reproducing apparatus capable of performing a track jump. An optical pickup (P/U) 102 makes a light beam focused on an objective lens be put on a signal track on an optical disc 101 under control of a servo controller 106 and focuses light reflected from a signal recording side on the objective lens. Then, the P/U 102 makes the light focused on the objective lens to be incident on an optical detector (not shown) to detect a focus error signal and a tracking error signal.

The optical detector is composed of a plurality of optical detecting devices. An electric signal proportional to the amount of light obtained from the optical detecting devices is output to a radio frequency (RF) and servo error generator 104. The RF and servo error generator 104 detects an RF signal for reproduction of data and a focus error signal FE and a tracking error signal TE for servo control, from the electric signal output from the optical detector. The RF signal is output to a decoder 105 for reproduction, and servo error signals, i.e., FE and TE, are output to the servo controller 106. A control signal for recording of data is output to an encoder 103.

The encoder 103 codes data to be recorded in a recording pulse having a format required by the optical disc 101 and records the coded data on the optical disc 101 through the P/U 102. The decoder 105 reconstructs original data from the RF signal.

A host such as a personal computer may be connected to the optical recording/reproducing apparatus. The host transmits a recording/reproducing command to a microcomputer 111 through an interface unit 110 of the optical recording/reproducing apparatus, transmits the data to be recorded to the encoder 103 and receives the reconstructed data from the decoder 105. The microcomputer 111 controls the encoder 103, the decoder 105 and the servo controller 106 according to the recording/reproducing command of the host.

For the interface unit 110, an advanced technology attached packet interface (ATAPI) unit is typically used. The ATAPI is a specification for interfacing an optical recording/reproducing apparatus such as a compact disc (CD) drive or a digital versatile disc (DVD) drive with a host. The ATAPI is proposed for transmitting data decoded in the optical recording/reproducing apparatus to the host. The ATAPI converts the decoded data into a protocol in a packet format which can be processed by the host, before transmission.

The servo controller 106 processes the focus error signal FE to output a driving signal for focusing control to a focus servo driver 107 and processes the tracking error signal TF to output a driving signal for tracking control to a tracking servo driver 108.

The focus servo driver 107 drives a focus actuator within the P/U 102 to thereby shift the P/U 102 up or down so that the P/U 102 can follow up the rotating optical disc 101 with an up-and-down motion.

The tracking servo driver 108 drives a tracking actuator within the P/U 102 to thereby shift the objective lens of the P/U 102 in a radial direction so that the location of a beam can be modified, and a predetermined track is followed.

When the optical disc 101 is a rewritable disc, particularly, a digital versatile disc random access memory (DVD-RAM), since there is no information on an initial disc, disc control and recording cannot be performed. To overcome this problem, disc tracks are formed on land and grooves to allow information to be recorded on each track, and sector addresses and control information for random access and rotation control are separately recorded on the disc, thereby allowing tracking control to be executed on a blank disc on which an information signal is not recorded on. The control information may be recorded in the beginning of each sector by pre-formatting a header area or may be recorded in wobbling shape along each track. The wobbling means that information to be applied to a disc by modulating a certain clock, for example, information on a certain location and information on the rotational speed of a disc, is supplied to the power of a laser diode, so that control signal is recorded at the boundary surface between tracks by a variation of the light beam of the corresponding laser.

For example, in the case of a DVD-RAM, a header area which is pre-formatted at the beginning of each sector is composed of four header fields HD1 through HD4, as shown in FIG. 2(*a*). The header fields HD1/2 and the header fields HD3/4 are offset from the center of a track in an opposite direction to each other. In other words, the phase of the header fields HD1/2 is reverse to the phase of the header fields HD3/4, and the phase of a tracking error signal detected from the header fields HD1/2 is reverse to the phase of a tracking error signal detected from the header fields HD3/4. In addition, referring to FIG. 2(*a*), it can be known that the track boundary of a user area in which actual data is recorded has a wobbling shape.

Accordingly, a header mask is put on a header area, as shown in FIG. 2(*b*), and a track error signal is held during a track servo to prevent deviation from a track center.

To generate a header mask signal indicating a header area, the header area should be detected first.

Various methods can be used for detecting the header area, and one of them is using a wobble signal as shown in FIGS. 2(*a*) through 2(*c*).

More specifically, since the number of wobble signals in each sector is fixed, the header area is detected by counting the number of wobble signals. Since a wobble signal may not be detected due to a defect on a disc, the header area is detected by counting clocks, i.e., phase locked loop (PLL)-wobbles, in which wobble signals actually recorded on the disc are subjected to a PLL, as shown in FIG. 2(c), and a header mask signal (H/M) is generated as shown in FIG. 2(b).

For example, PLL-wobble signals are counted starting from a falling point of a previous header mask signal. When a predetermined number has been counted, it is determined that a header area begins, and thus a header mask signal is generated.

Since a wobble signal is not recorded in the header area, no wobble signal is detected from the header area. Accordingly, a wobble is omitted in a header area. When a wobble signal detected is subjected to a PLL without considering the omission of a wobble signal, a PLL-wobble signal elongates. This causes a header mask signal to be generated lagging behind an actual header area, that is, generation of a header mask signal is delayed.

To solve this problem, a PLL-wobble signal is held with a tracking error signal in a header area.

When a track jump command is input, the RF and servo error generator 104 detects an RF signal (shown in FIG. 3(d)) and a tracking error signal TE (shown in FIG. 3(a)) through the P/U 102 in a state in which only a focus servo is on, and simultaneously, the servo controller 106 generates a kick pulse (or a jump pulse) as shown in FIG. 3(c). The kick pulse is applied to the tracking actuator through the tracking servo driver 108. When the kick pulse is applied to the tracking actuator, the speed of the tracking actuator increases, and the objective lens of the tracking actuator is pushed toward a track jump direction by acceleration of the tracking actuator.

At this time, a brake pulse is applied to the actuator at a zero cross point of the tracking error signal for a predetermined brake time to reduce the speed of the actuator. In other words, the tracking actuator is accelerated by the kick pulse and then decelerated by the brake pulse. The brake pulse is an inverted one of the kick pulse and is generated to stably stop the actuator at an exact desired location. When the brake time previously set has elapsed, a tracking servo is turned on.

A track zero crossing (TZC) signal which is turned on/off at the zero cross point of the tracking error signal TE, as shown in FIG. 3(b), is used as a reference signal for determining a kick pulse, brake pulse and a brake on time during a track jump. In other words, the TZC signal is used as a reference signal when determining at what point the brake pulse will be generated after the kick pulse is generated.

When the tracking actuator passes a header area (see the circled part in FIG. 3(a)) during a track jump, the TZC signal may be generated prior to or behind a desired location due to a header, or one more pulse of the TZC signal may be generated as shown in the circled part in FIG. 3(b).

Accordingly, when the optical disc 101 includes header areas like a DVD-RAM, a problem may occur due to a header area during a track jump.

In other words, when the TZC signal is generated prior to or behind a desired location, or when more pulses of the TZC signal than is desired are generated, the TZC signal goes beyond a location where it is originally supposed to be generated, and a kick time, brake time and a servo on time become irregular so that a track jump cannot be exactly and stably performed.

In addition, as shown in FIG. 4(a), when a track jump is performed depending on a track jump command, a wobble signal may not be detected since the tracking actuator crosses tracks.

Since a wobble signal is omitted, as shown in FIGS. 4(d) through 4(g), during a track jump, a PLL-wobble signal elongates. A wobble signal recorded on an actual disc is shown in FIG. 4(d). The part in the circle of FIG. 4(d) is enlarged in FIG. 4(f). The PLL-wobble signal, in which a wobble signal detected as shown in FIG. 4(d) is subjected to a PLL, is shown in FIG. 4(e). The part in the circle of FIG. 4(e) is enlarged in FIG. 4(g). A header area is indicated through an RF signal of FIG. 4(b). The RF signal corresponding to the header area is always higher than a certain level. The RF signal has the same phase with respect to the header fields HD1/2 and the header fields HD3/4.

As shown in FIG. 4(c), a rising point of a header mask signal, that is generated after a track jump, lags behind the actual location of a header area. Consequently, the header area cannot be masked so that a tracking error signal cannot be held in the header area. Accordingly, the tracking error signal becomes larger as shown in the circled part of FIG. 4(a), and the actuator follows up the header.

When the actuator follows up the header, track slippage may occur, and a track servo becomes unstable due to a change in a discrete track error. The unstable track servo deteriorates recording and reproducing characteristics.

In other words, a header area that comes first after a track jump is performed cannot be stably masked so that the system can be unstable due to a header during the track jump.

SUMMARY OF THE INVENTION to solve the above problems, a first object of the present invention is to provide a method for performing a track jump without being influenced by a header area.

A second object of the present invention is to provide a trackjump method of inhibiting a wobble signal from being subjected to a phase locked loop (PLL) and holding a previous PLL-wobble signal during a track jump.

A third object of the present invention is to provide a track jump method of generating a header mask signal using a signal that is not influenced by a wobble period during a track jump and for a predetermined period of time after the track jump.

In order to achieve the above objects, the present invention provides a track jump method including the steps of receiving a track jump command; checking whether a current location is the end of a header area when the track jump command is received; standing by without performing a track jump when the current location is not the end of the header area and performing the track jump with inhibition of a PLL of a wobble signal when the current location is the end of the header area; and resuming the PLL of the wobble signal when the track jump is completed.

The checking step determines an off-point of a header mask signal indicating a header area as the end point of the header area.

The PLL inhibiting step inhibits the PLL of the wobble signal and holds a PLL-wobble signal to a value obtained before the track jump is performed.

The PLL inhibiting step slices a sum of or a difference between optical reflected signals from the optical recording medium at a certain level to generate a header mask signal indicating a header area.

The PLL inhibiting step counts wobble signals subjected to the PLL to generate a header mask signal indicating a header area.

The PLL resuming step counts wobble signals subjected to the PLL to generate a header mask signal indicating a header area when the track jump is completed.

The PLL inhibiting step inhibits the PLL of the wobble signal in a section in which a header mask signal is on.

The PLL resuming step terminates the track jump before a point at which a header mask signal indicating a header area is turned on.

In another embodiment, a track jump method includes the steps of receiving a trackjump command; checking whether a current location is the end of a header area when the track jump command is received; and performing a track jump when the current location is the end of the header area and standing by without performing the track jump until the header area ends when the current location is not the end of the header area.

When an N-time consecutive track jump command is received, a procedure of starting the track jump at a falling edge of a header mask signal, ending the track jump before a rising edge of the header mask signal, and turning on a servo is repeated N times.

In still another embodiment, a track jump method includes the steps of performing a track jump with inhibition of a PLL of a wobble signal when a track jump command is received; and resuming the PLL of the wobble signal when the track jump is completed.

In another embodiment, a track jump method includes the steps of masking a header area using a first header mask signal indicating the header area during a track jump; and masking a header area using a second header mask signal indicating the header area during normal recording/reproducing, wherein the first header mask signal is not influenced by a wobble period.

The first header mask signal is generated by slicing a sum of or a difference between optical reflected signals from the optical recording medium at a certain level.

The second header mask signal is generated by counting wobble signals subjected to the PLL.

The track jump method further includes the step of masking a header area using the first header mask signal until a wobble signal is normally detected after the track jump is completed.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

The present invention is characterized by that a track jump is performed at a falling point of a header mask signal to avoid a header area, and a track jump operation is held before the falling point even if a track jump command is generated. The header mask signal indicates the header area. Various methods of detecting a header area and generating a header mask signal have been proposed. A header mask signal may be generated using a phase locked loop (PLL)-wobble signal which is generated by subjecting a wobble signal formed in wobbling shape on a track to a PLL. Alternatively, a header mask signal may be generated using a read channel 1 signal or a read channel 2 signal.

In a first embodiment of the present invention, during a track jump, a wobble signal is inhibited from being subjected to a PLL, a previous PLL-wobble signal is held, and a header mask signal is generated using the held PLL-wobble signal.

In a second embodiment of the present invention, during a track jump, a header mask signal is generated using a read channel 1 signal or a read channel 2 signal, and after completion of the track jump, a header mask signal is generated using a PLL-wobble signal.

In the present invention, it is assumed that a header area is defined by a "high" level of a header mask signal, and a data recordable area is defined by a "low" level of the header mask signal. The falling point of the header mask signal indicates the end of a header area.

First Embodiment

Figure 1:
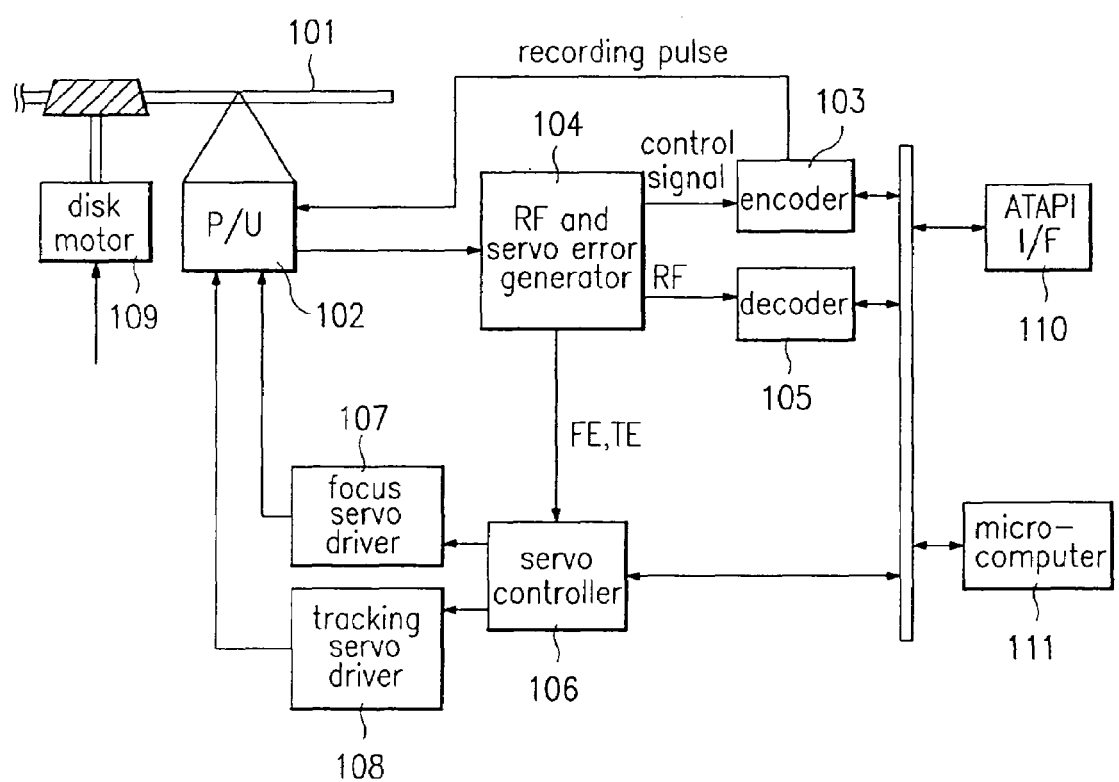
FIG. 1 is a block diagram of a typical optical recording/reproducing apparatus.
Figure 2:
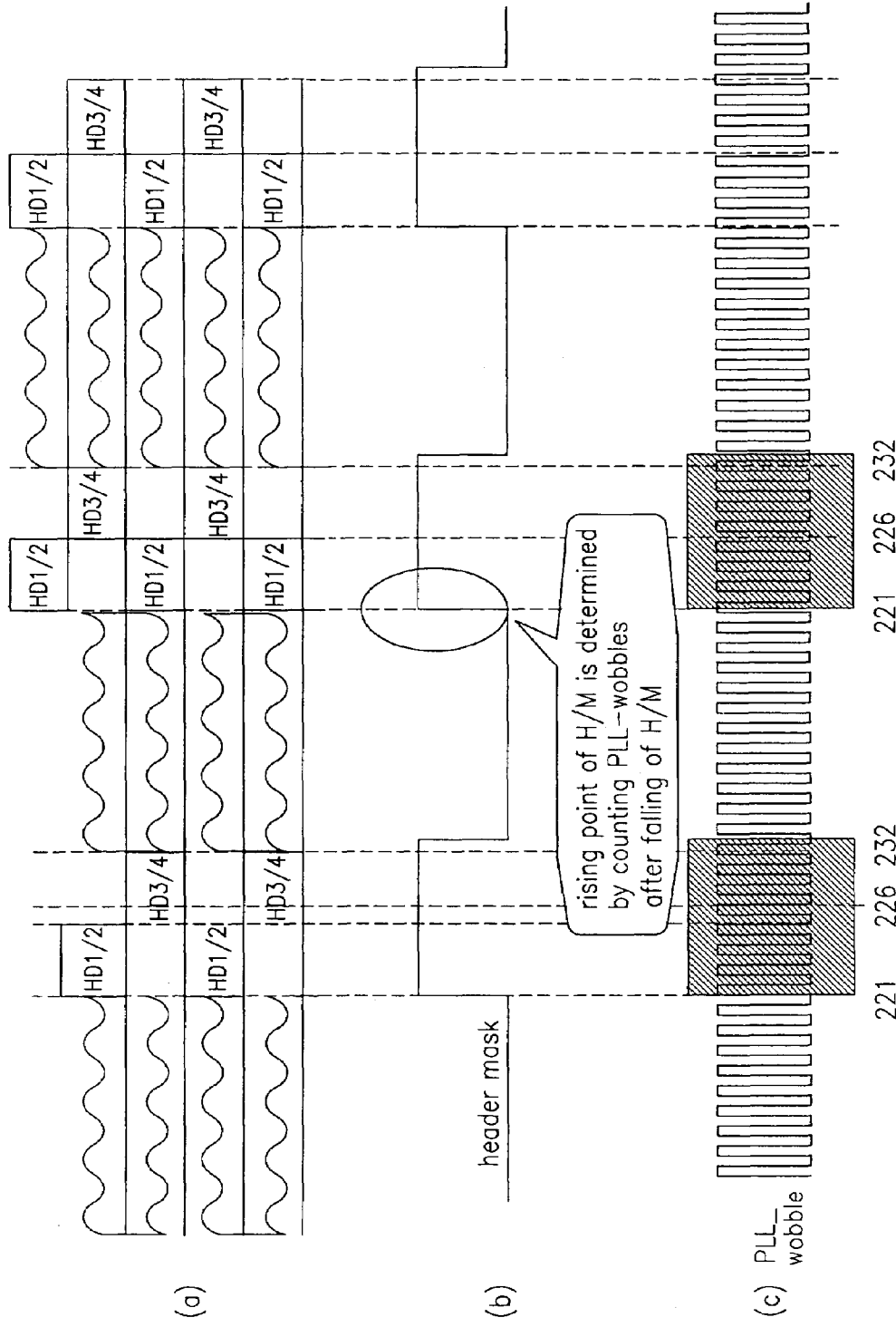
FIGS. 2(a) through 2(c) are timing diagrams showing generation of a header mask during a normal servo.
Figure 3:
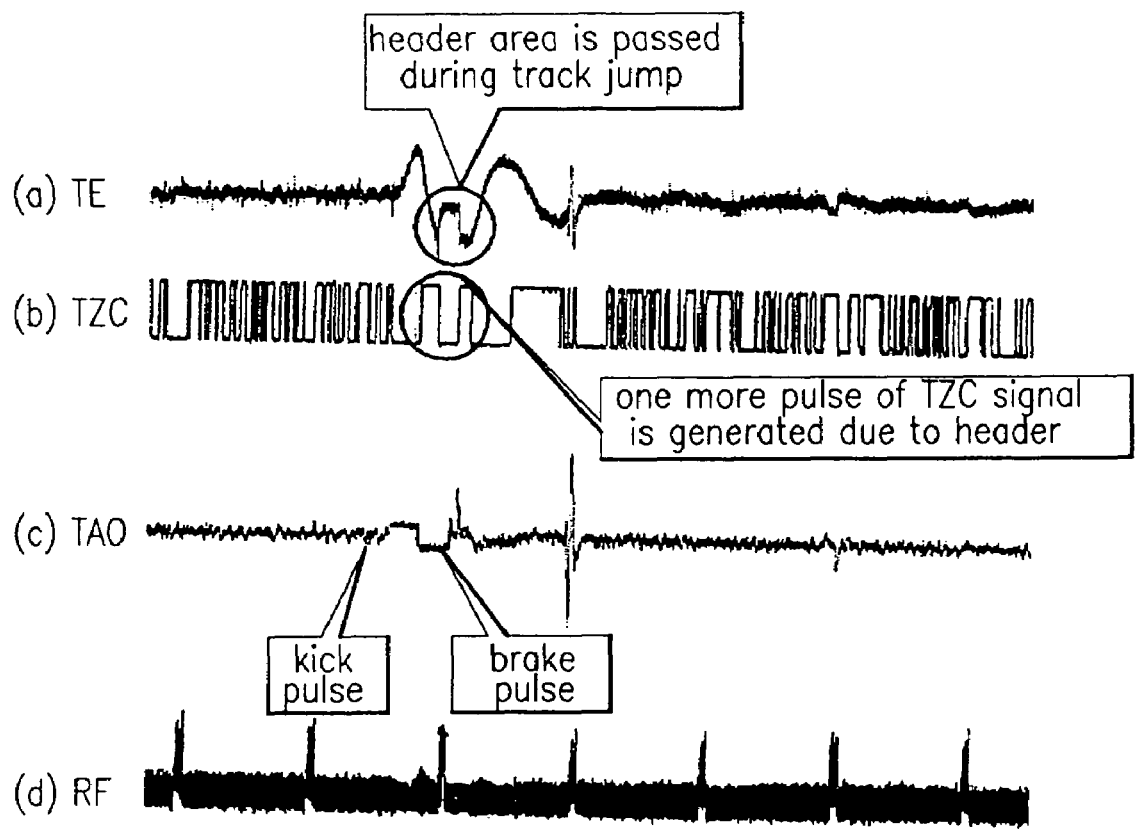
FIGS. 3(a) through 3(d) are timing diagrams showing a tracking error signal and a track zero crossing (TZC) signal in the case where a header area exists during a track jump performed in FIG. 1 and are timing diagrams related to the track jump.
Figure 4:
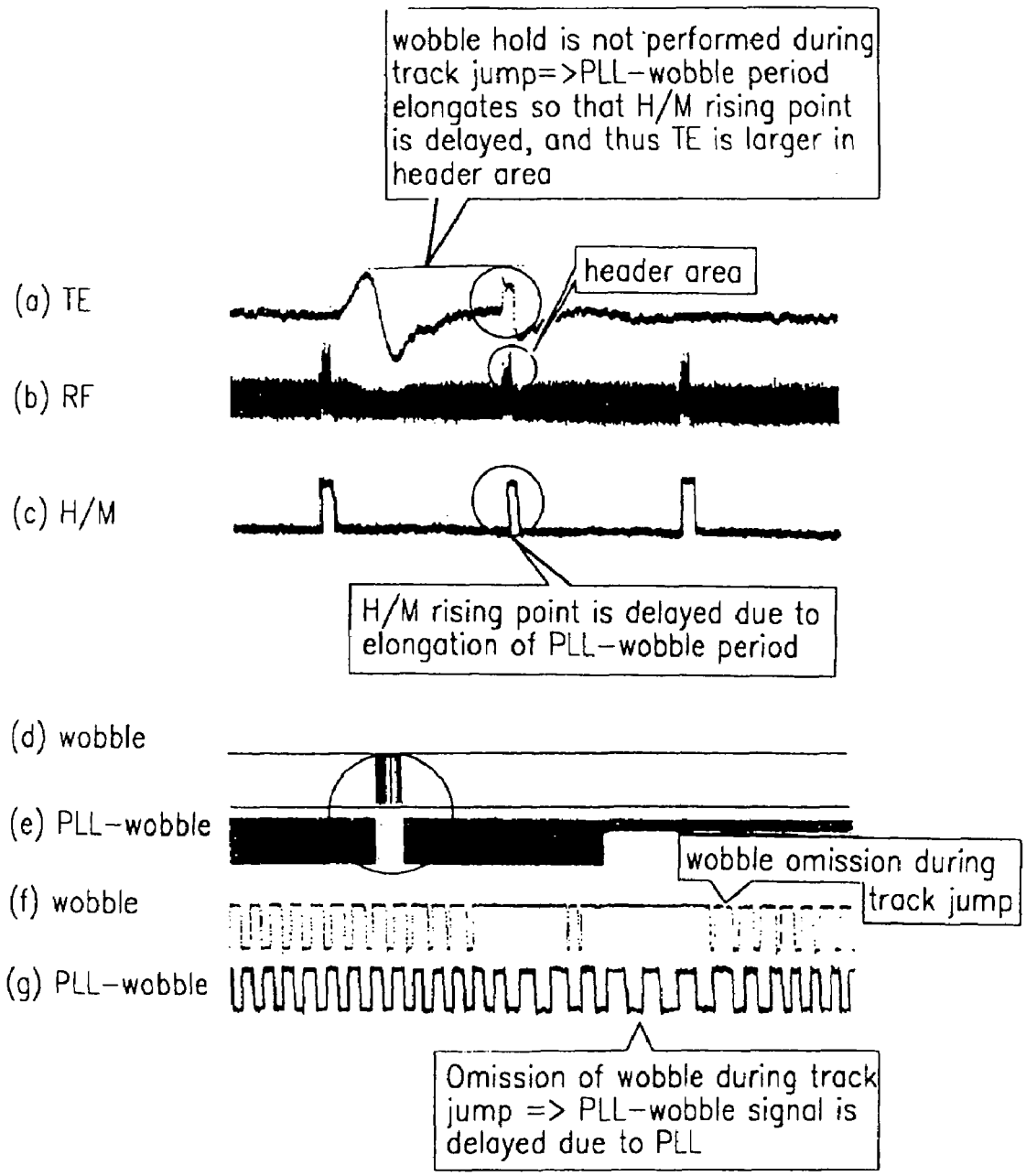
FIGS. 4(a) through 4(g) are timing diagrams showing the trackjump performed in FIG. 1.
Figure 5:
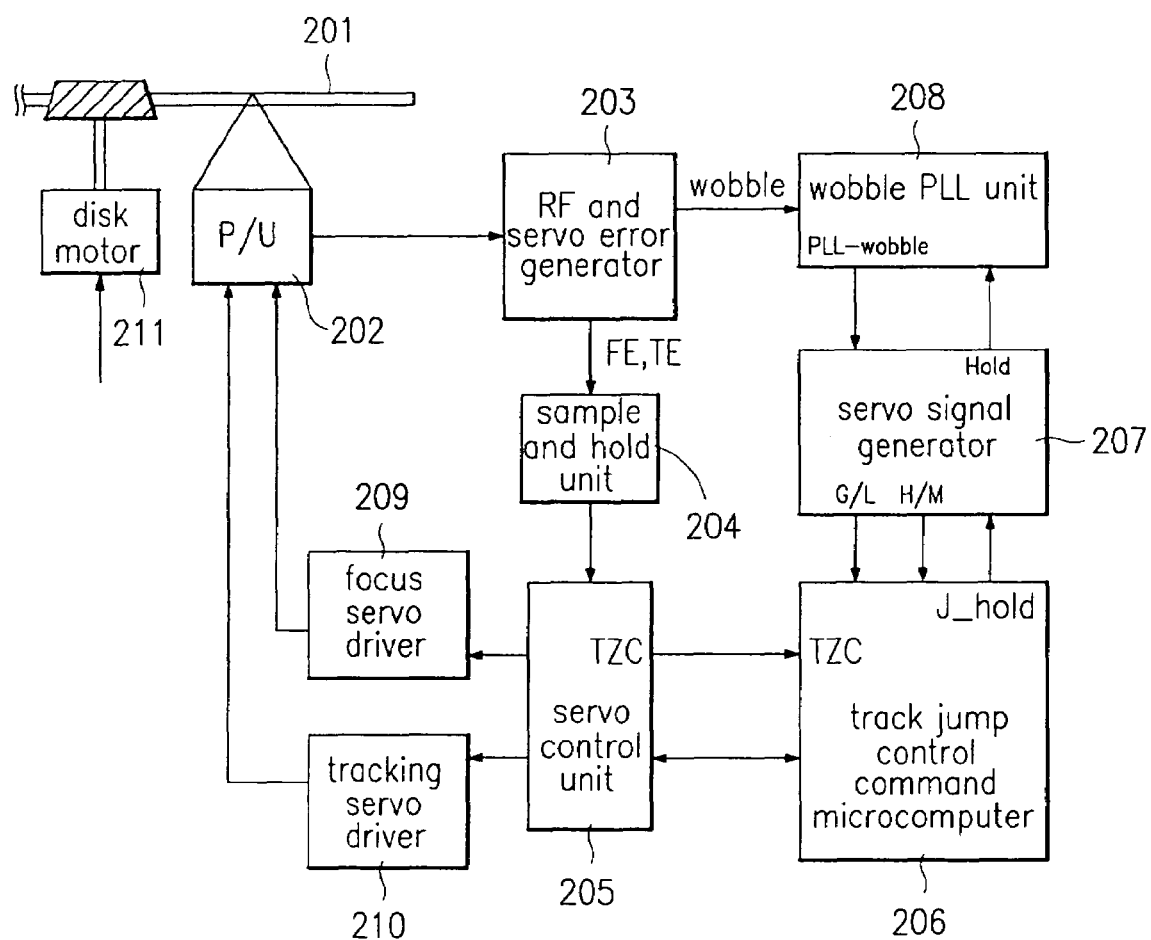
FIG. 5 is a block diagram of a configuration for performing a trackjump according to a first embodiment of the present invention.

FIG. 5 is a block diagram showing a configuration for performing a track jump method according to the first embodiment of the present invention. Only portions related to the track jump are illustrated.

Referring to FIG. 5, the configuration includes an optical disc 201 to which data can be rewritten, an optical pickup (P/U) 202 for recording and reproducing information to and from the optical disc 201, a radio frequency (RF) and servo error generator 203 for generating an RF (or a read channel 1) signal and servo error signals, such as a read channel 2 signal, a tracking error signal and a focus error signal from an electric signal output from the P/U 202, a sample and hold unit 204 for holding the tracking error signal and the focus error signal, which are generated by the RF and servo error generator 203, in a header area, a servo controller 205 for individually processing the focus error signal and the tracking error signal, which have been held or bypassed by the sample and hold unit 204, to generate a focus driving signal and a tracking driving signal, a microcomputer 206 for controlling a track jump, a servo signal generator 207 for generating a header mask (H/M) signal and an L/G switching signal and controlling a PLL of a wobble signal according to a jump hold signal J_hold output from the microcomputer 206, a wobble PLL unit 208 for inhibiting a wobble signal from being subjected to a PLL and holding a previous PLL-wobble signal according to a hold signal Hold output from the servo signal generator 207, a focus servo driver 209 for receiving the focus driving signal from the servo controller 205 and driving a focus actuator within the P/U 202, and a tracking servo driver 210 for receiving the tracking driving signal from the servo controller 205 and driving a tracking actuator within the P/U 202.

When a track jump is performed in the first embodiment of the present invention having such configuration, the microcomputer 206 checks a falling point of a header mask signal output from the servo signal generator before outputting a track jump control command to the servo controller 205.

When a falling edge of the header mask signal is not detected, the microcomputer 206 holds the track jump control command until the falling edge is detected and outputs the track jump control command to the servo controller 205 when the falling edge of the header mask signal is detected.

The microcomputer 206 detects a track zero crossing (TZC) signal which is turned on/off at a zero cross point of the tracking error signal input through the servo controller 205 and outputs it to the microcomputer 206. The microcomputer 206 uses the TZC signal as a reference signal for controlling a kick pulse, brake pulse and a brake time during a track jump.

The microcomputer 206 also generates a jump hold signal J_hold for inhibiting a wobble signal from being subjected to a PLL and holding a previous PLL-wobble signal during a track jump and outputs it to the servo signal generator 207. When receiving the jump hold signal J_hold, the servo signal generator 207 outputs a hold signal Hold to the wobble PLL unit 208.

The servo signal generator 207 also outputs the hold signal Hold to the wobble PLL unit 208 during a normal servo, that is, during normal recording/reproducing, when a header area is detected.

The wobble PLL unit 208 generates a PLL-wobble signal by subjecting a wobble signal recorded on an actual disc to a PLL and outputs the PLL-wobble signal to the servo signal generator 207. During this operation, when the hold signal Hold is received from the servo signal generator 207, the wobble PLL unit 208 stops the PLL of the wobble signal and outputs a PLL-wobble signal that is held to a value obtained before the track jump operation to the servo signal generator 207.

The servo signal generator 207 counts PLL-wobble signals output from the wobble PLL unit 208, generates a header mask signal H/M and a land/groove switching signal L/G, and outputs them to the microcomputer 206.

Figure 6:
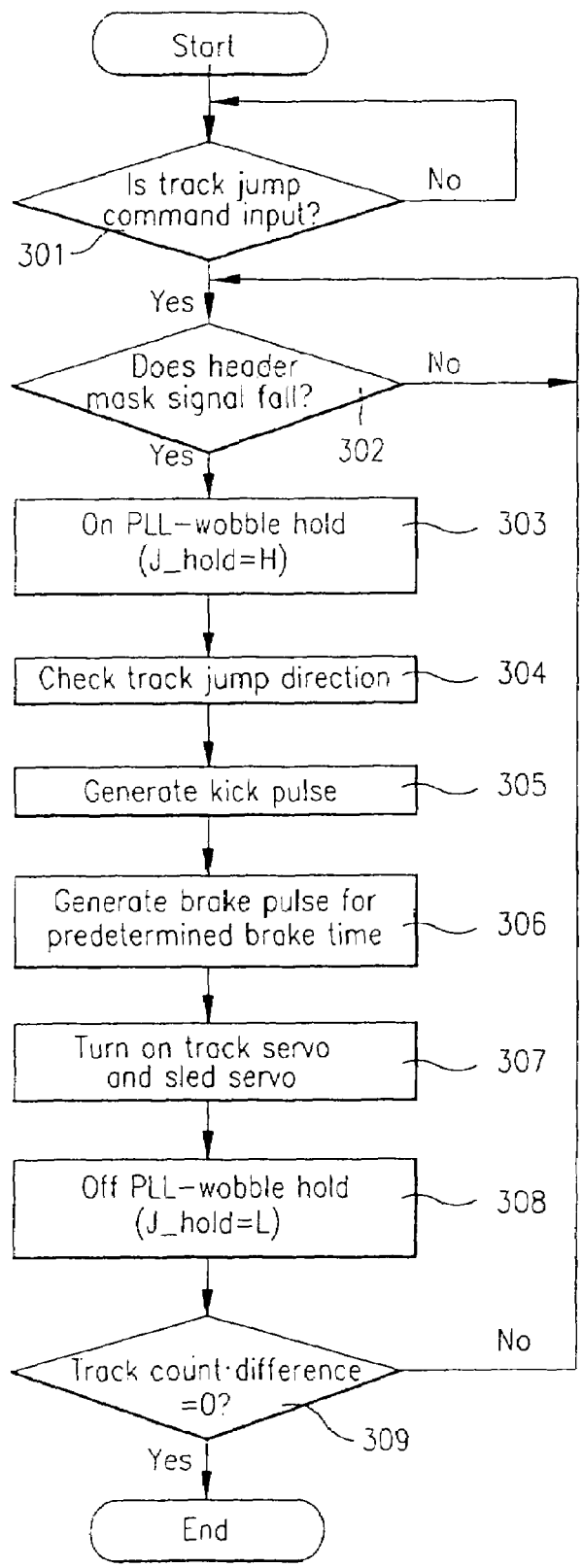
FIG. 6 is a flowchart of a track jump according to the first embodiment of the present invention.

FIG. 6 is a flowchart of an operation according to the present invention when the track jump command is input, and FIGS. 7(a) through 7(f) are timing diagrams during the operation.

Figure 7:
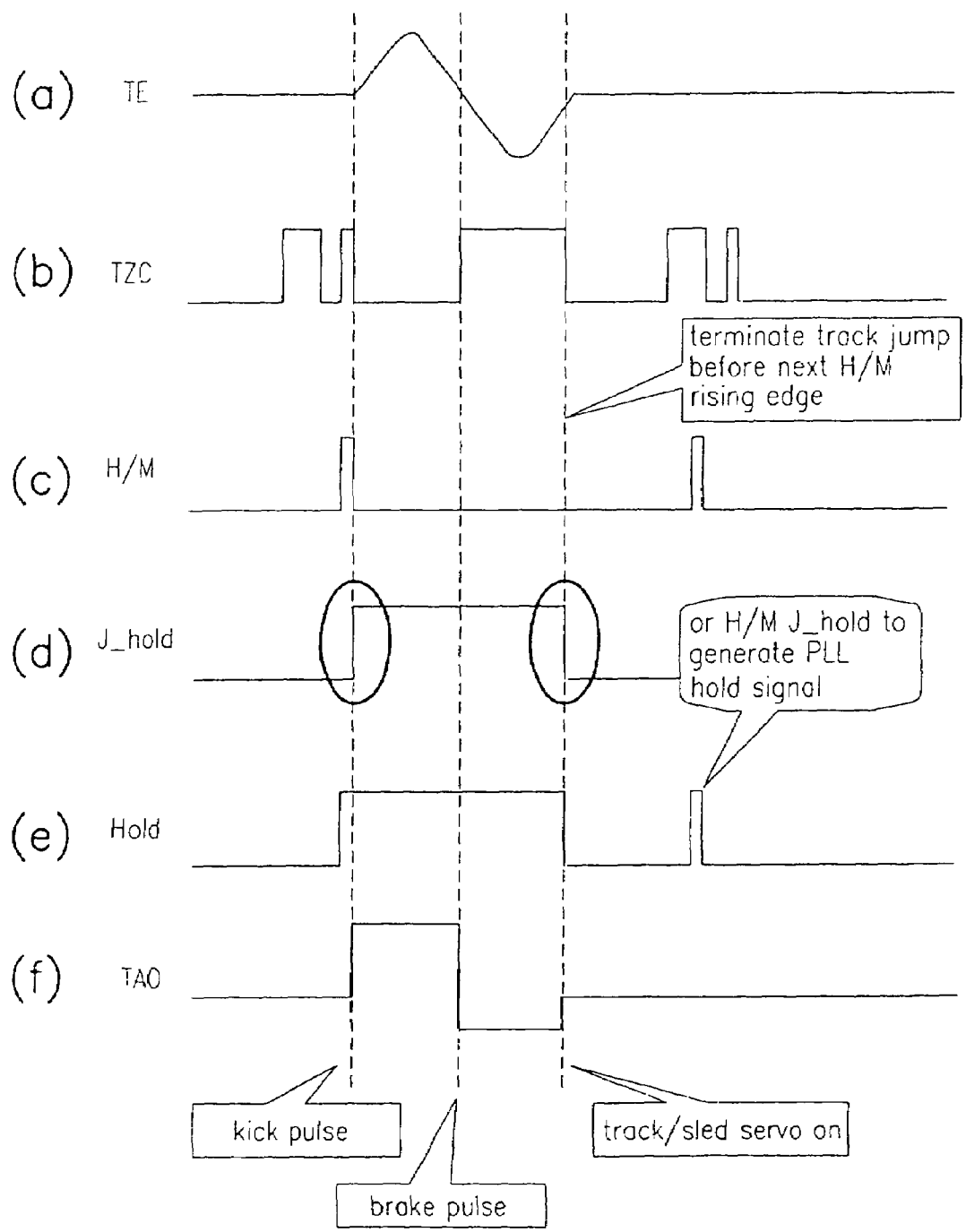
FIGS. 7(a) through 7(f) are timing diagrams for showing the processes of a track jump according to the present invention.
Figure 8:
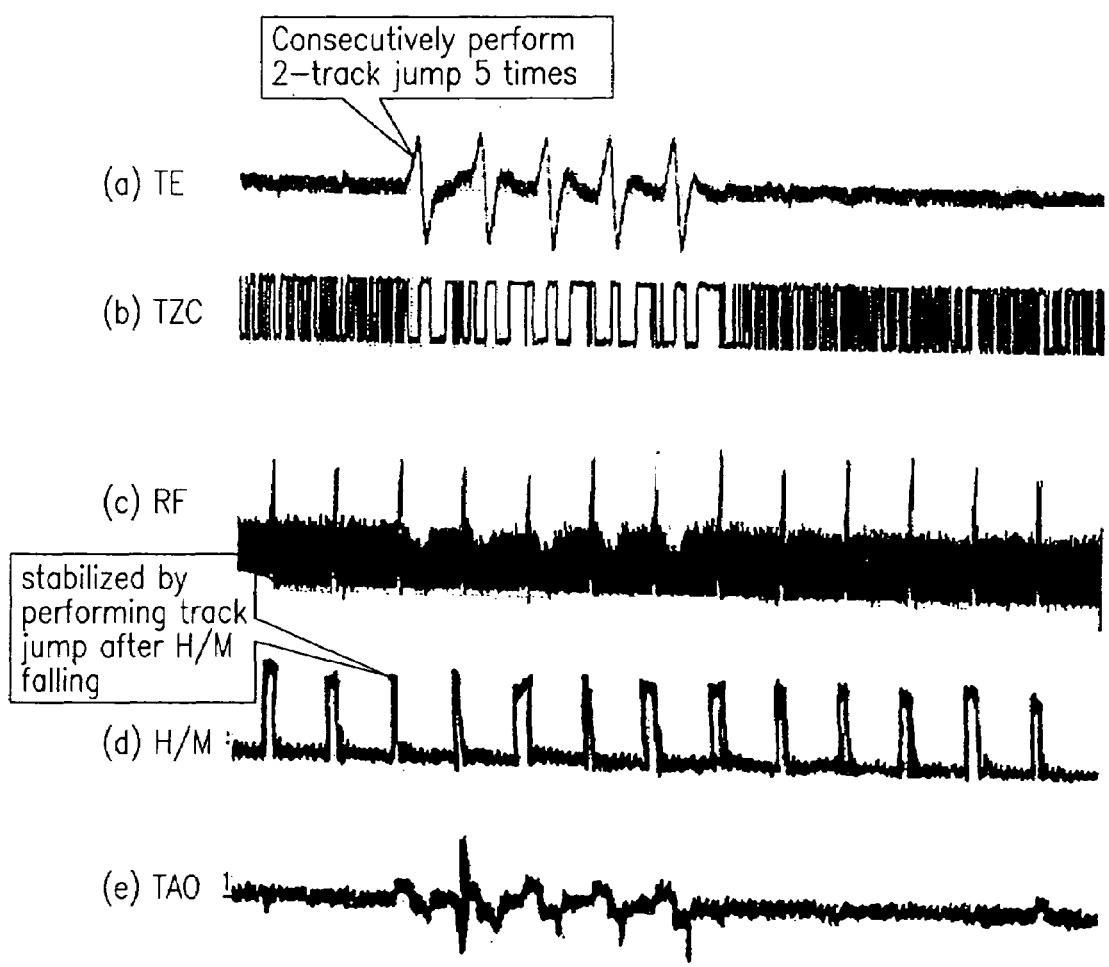
FIGS. 8(a) through 8(e) are timing diagrams of a tracking error signal and a TZC signal which are generated when N track jumps are performed avoiding a header area according to the first embodiment of the present invention, and are timing diagrams related to the track jump.

When a disc is a rewritable disc, particularly, a digital versatile disc random access memory (DVD-RAM), FIGS. 7(a) through (f) show an example of a forward 2 track jump. In the case of a DVD-RAM, since data can be recorded on both land and groove tracks, two tracks are jumped during one period of a tracking error signal generated during a track jump, as shown in FIG. 7(a).

More specifically, when a track jump command is input in step 301, the servo signal generator 207 counts PLL-wobble signals output from the wobble PLL unit 208, generates a header mask signal, and outputs it to the microcomputer 206. In step 302, the microcomputer 206 checks a falling point of the header mask signal output from the servo signal generator 207 before performing a track jump, that is, before outputting a track jump control command to the servo controller 205. The falling point of the header mask signal is checked for the purpose of making a TZC signal not be influenced by a header during the track jump.

Accordingly, when a falling edge of the header mask signal is not detected in step 302, the track jump control command is held until the falling edge is detected. When the falling edge of the header mask signal is detected, as shown in FIG. 7(c), the microcomputer 206 outputs the track jump control command to the servo controller 205, and simultaneously, outputs a jump hold signal J_hold in a "high" state, as shown in FIG. 7(d), to the servo signal generator 207 in step 303. In the present invention, it is assumed that the jump hold signal J_hold is in a "high" state during a track jump.

When receiving the jump hold signal J_hold in a "high" state, the servo signal generator 207 outputs a hold signal Hold in a "high" state to the wobble PLL unit 208. Here, it is assumed that the hold signal Hold for inhibiting a wobble PLL is in a "high" state.

Meanwhile, the servo signal generator 207 outputs the hold signal Hold to the wobble PLL unit 208 when a header area is detected during normal recording/reproducing. In other words, the servo signal generator 207 ORs the jump hold signal J_hold, as shown in FIG. 7(d), and the header mask signal H/M, as shown in FIG. 7(c), and outputs the result of ORing, as shown in FIG. 7(e), to the wobble PLL unit 208.

The wobble PLL unit 208 subjects a wobble signal recorded on a disc to a PLL to generate a PLL-wobble signal and outputs the generated PLL-wobble signal to the servo signal generator 207. During this operation, when the hold signal Hold in a "high" state, as shown in FIG. 7(e), is input from the servo signal generator 207, the wobble PLL unit 208 stops the wobble PLL operation of subjecting the wobble signal recorded on the disc to the PLL. Then, the wobble PLL unit 208 outputs a PLL-wobble signal which is held to a previous value, that is, a value obtained before reaching a header area in the case of a normal servo or a value obtained before performing a track jump, to the servo signal generator 207. Accordingly, the PLL-wobble signal does not elongate and has a regular period during a track jump.

When the falling edge of the header mask signal is detected as described above, the microcomputer 206 outputs the jump hold signal J_hold to the servo signal generator 207, and simultaneously, checks a direction of a track jump for starting the trackjump in step 304. In other words, it is determined whether a track jump is performed from an inner track to an outer track or from an outer track to an inner track.

When the trackjump direction is determined in step 304, a kick pulse is generated toward the track jump direction and applied to a tracking actuator in step 305. When the kick pulse is generated in step 305, the speed of the tracking actuator increases, and an objective lens of the tracking actuator is pushed toward the track jump direction by acceleration of the tracking actuator. At this time, a TZC signal is detected.

Next, a brake pulse is applied to the tracking actuator at a rising edge of the TZC signal for a predetermined brake time to decelerate the tracking actuator in step 306. When the previously set brake time has elapsed, a tracking servo and a sled servo are turned on in step 307. In particular, the tracking servo and the sled servo are turned on after the track jump starts and before the header mask signal rises.

When the tracking servo and the sled servo are turned on step 307, the microcomputer 206 outputs the jump hold signal J_hold in a "low" state, as shown in FIG. 7(d), to the servo signal generator 207 in step 308.

When a falling edge of the jump hold signal J_hold is detected, the servo signal generator 207 outputs the hold signal Hold in a "low" state to the wobble PLL unit 208. Accordingly, when the falling edge of the hold signal Hold is detected, the wobble PLL unit 208 resumes a PLL of a wobble signal. In other words, holding of the PLL-wobble signal is interrupted, and an actual wobble signal is subjected to a PLL. Then, the wobble PLL unit outputs a PLL-wobble signal to the servo signal generator 207.

When it is determined that the track jump fails to reach a target track in step 309, the progress returns to the step 302, and the track jump is continued.

As described above, since the present invention starts a track jump avoiding a header area, a TZC signal is not influenced by a header, as shown in FIG. 7(b). Accordingly, the TZC signal does not lead or lag behind a desired location during the track jump. In addition, the pulses of the TZC signal according to what is described are not generated during the track jump. Consequently, an exact and stable track jump is achieved.

The present invention holds a PLL-wobble signal during a track jump to prevent the PLL-wobble signal from elongating during the track jump, thereby exactly generating a header mask signal in a header area after the track jump is completed. Accordingly, a header coming first after the track jump can be stably masked, thereby preventing a tracking error from being greater in a header area. Therefore, track slippage or unstable track servo can be prevented.

FIGS. 8(a) through 8(e) show waveforms when a 2-track jump is consecutively performed N times. The track jump is performed avoiding a header area as described above.

In other words, the track jump is started in synchronization with the falling edge of a header mask signal. Then, the 2-track jump is completed before a rising edge of the header mask signal, and then a servo is turned on. This procedure is repeated N times.

Second Embodiment

Figure 9:
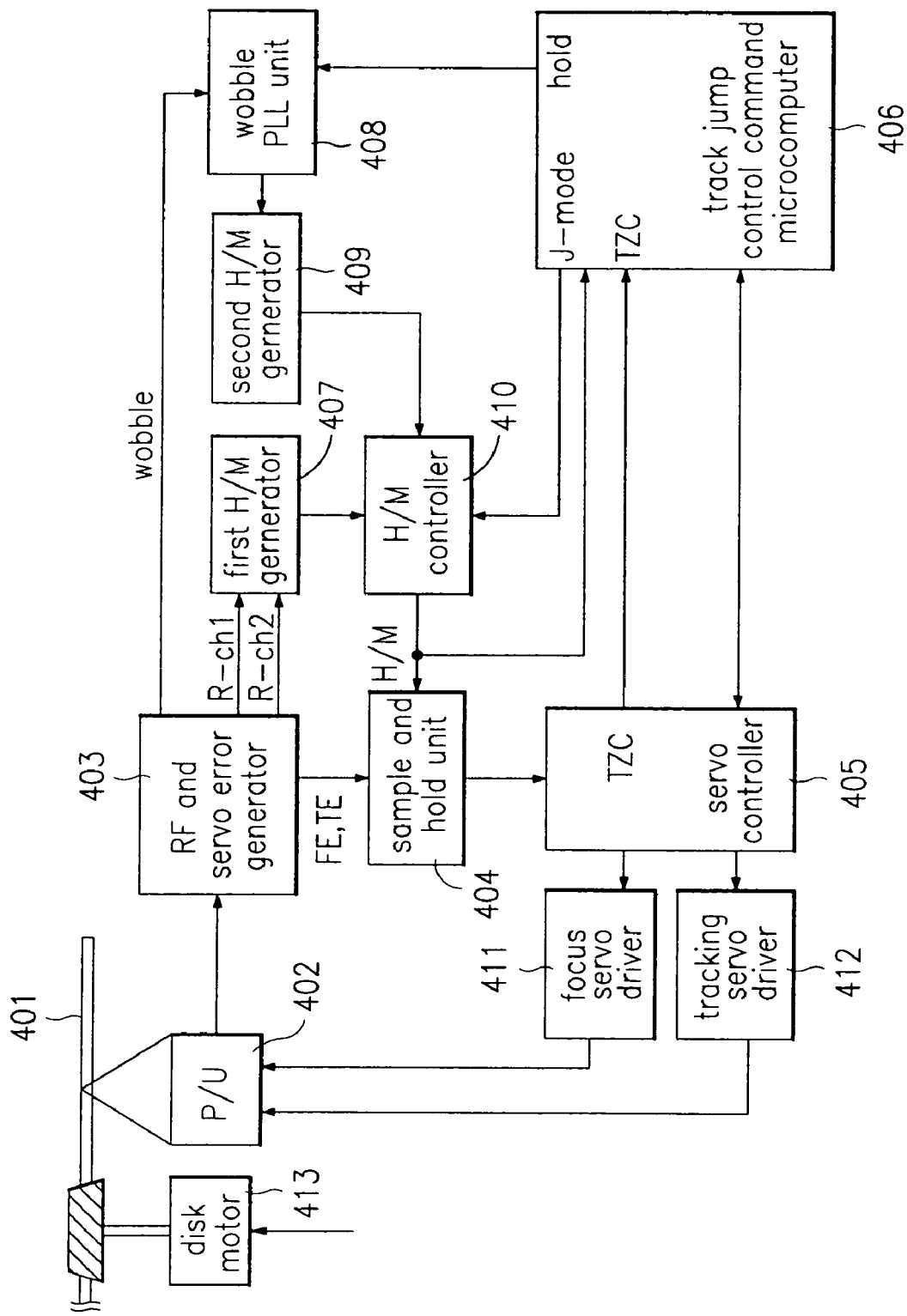
FIG. 9 is a block diagram of a configuration for performing a track jump according to a second embodiment of the present invention.

FIG. 9 is a block diagram showing a configuration for performing a track jump method according to the second embodiment of the present invention. Only portions related to the track jump are illustrated.

Referring to FIG. 9, the configuration includes an optical disc 401 to which data can be rewritten, an optical pickup (P/U) 402 for recording and reproducing information to and from the optical disc 401, a RF and servo error generator 403 for generating a RF signal (or a read channel 1 signal R-ch1) and servo error signals such as a read channel 2 signal R-ch2, a tracking error signal TE and a focus error signal FE from an electric signal output from the P/U 402, a sample and hold unit 404 for holding the tracking error signal and the focus error signal, which are generated by the RF and servo error generator 403, in a header area, a servo controller 405 for individually processing the focus error signal and the tracking error signal, which have been held or bypassed by the sample and hold unit 404, to generate a focus driving signal and a tracking driving signal, a microcomputer 406 for controlling a track jump according to the present invention, a first header mask (H/M) signal generator 407 for generating a first header mask signal indicating a header area using the read channel 1 signal or the read channel 2 signal, which is output from the RF and servo error generator 405, a wobble PLL unit 408 for subjecting a wobble signal output from the RF and servo error generator 403 to a PLL and outputting a PLL-wobble signal, a second H/M signal generator 409 for counting PLL-wobble signals output from the wobble PLL unit 408 and generating a second header mask signal indicating a header area, a H/M controller 410 for outputting either of the first header mask signal and the second header mask signal to the sample and hold unit 410 under control of the microcomputer 406, a focus servo driver 411 for receiving the focus driving signal from the servo controller 405 and driving a focus actuator within the P/U 402, and a tracking servo driver 412 for receiving the tracking driving signal from the servo controller 405 and driving a tracking actuator within the P/U 402.

Figure 10:
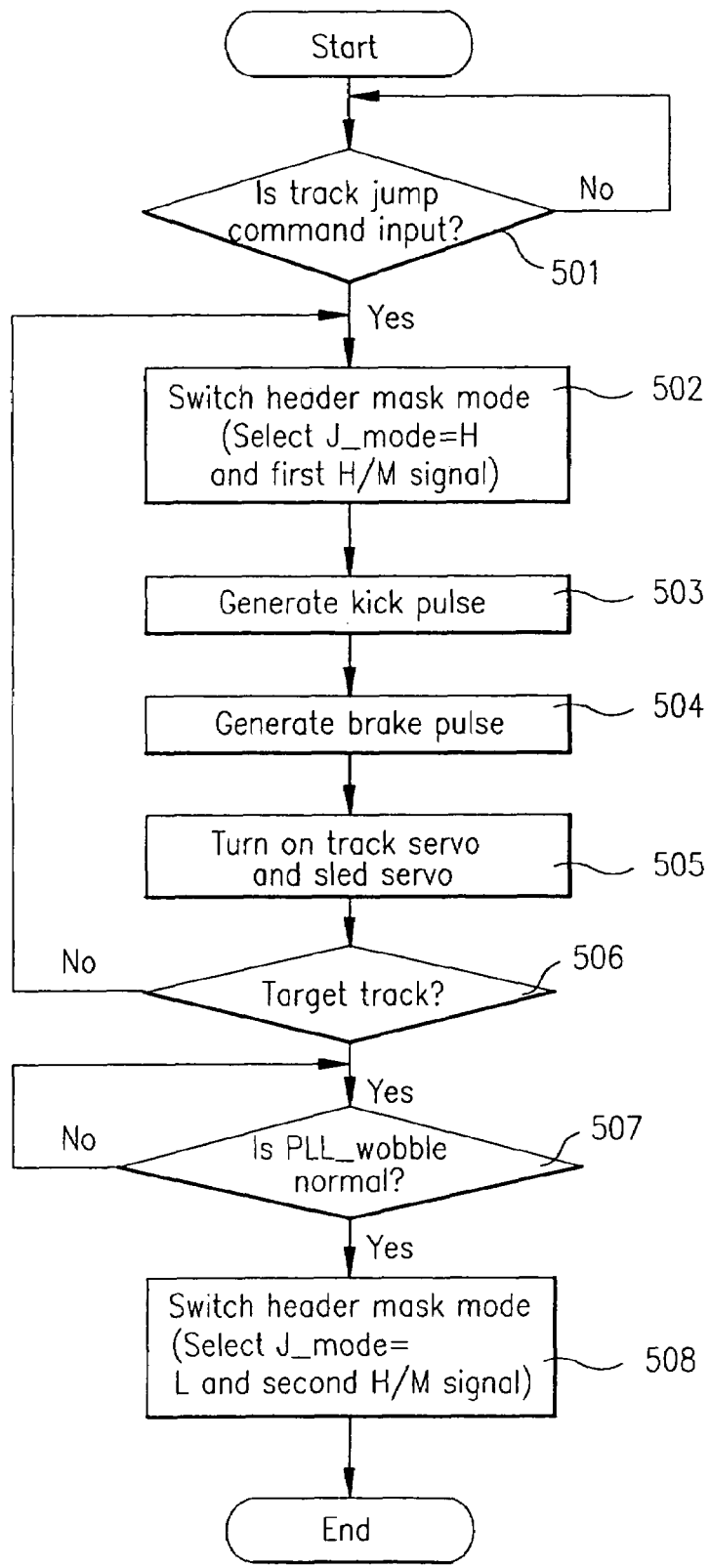
FIG. 10 is a flowchart of a trackjump according to the second embodiment of the present invention.
Figure 11:
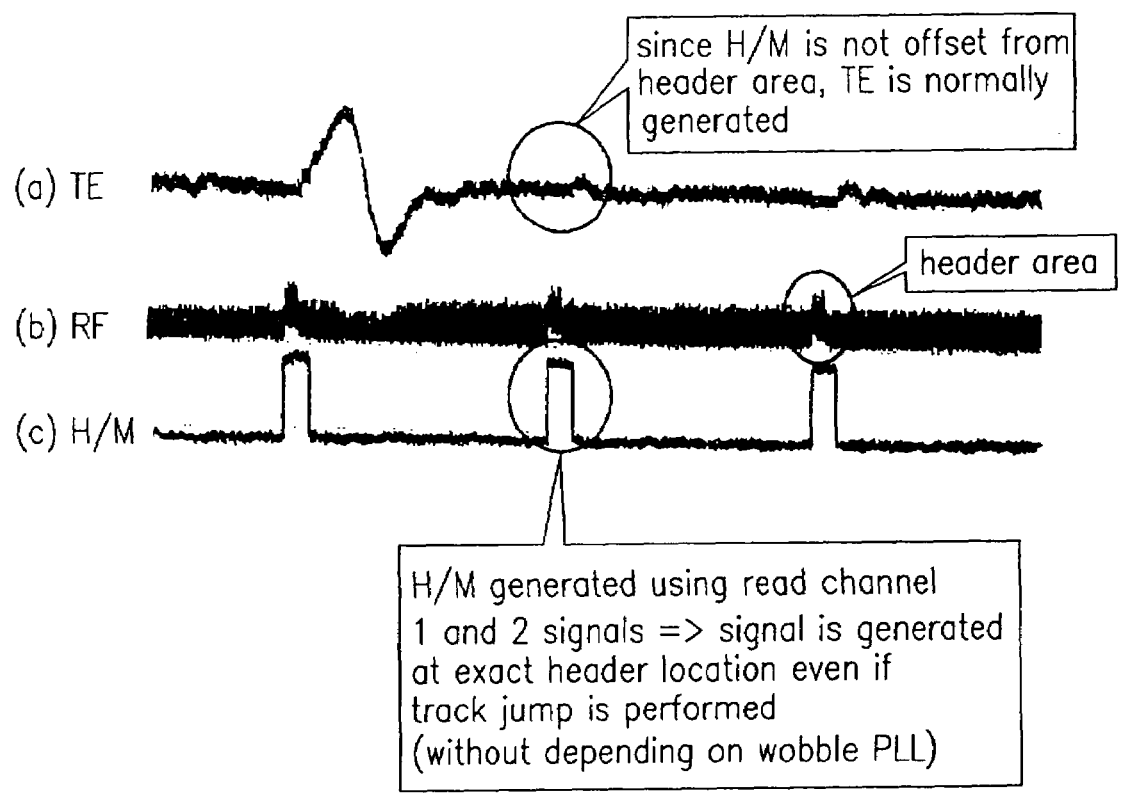
FIGS. 11(a) through 11(c) are timing diagrams for showing the processes of a trackjump according to the present invention.

FIG. 10 is a flowchart of an operation according to the second embodiment of the present invention when a track jump command is input, and FIGS. 11(a) through 11(c) are timing diagrams during the operation.

Like the first embodiment, when a disc is a rewritable disc, particularly, a DVD-RAM, FIGS. 11(a) through 11(c) show an example of a forward 2 track jump. In the case of a DVD-RAM, since data can be recorded on both land and groove tracks, two tracks are jumped during one period of a tracking error signal generated during a track jump, as shown in FIG. 11(a).

When a track jump is performed in the second embodiment of the present invention having such configuration, the microcomputer 406 outputs a track jump control command to the servo controller 405. When the track jump control command is input, the servo controller 405 detects a TZC signal which is turned on/off at a zero cross point of a tracking error signal and outputs it to the microcomputer 406 in step 501. The microcomputer 406 uses the TZC signal as a reference signal for controlling a kick pulse, brake pulse and a brake time during the track jump.

The microcomputer 406 switches a header mask mode J_mode in step 502. More specifically, the microcomputer 406 switches the header mask mode J_mode to a "high" state and outputs the switched J_mode to the H/M controller 410 in order to use a header mask signal generated by the first H/M generator 407.

In this embodiment, the H/M controller 410 selects a first header mask signal generated by the first H/M generator 407 when the J_mode is in a "high" state and selects a second header mask signal generated by the second H/M generator 409 when the J_mode is in a "low" state. The selected header mask signal is output to the sample and hold unit 404.

Here, the first H/M generator 407 may generate a header mask signal using a read channel 1 signal or a read channel 2 signal. For example, the header mask signal can be generated by slicing the read channel 1 signal or the read channel 2 signal at a certain level. In addition, when a header mask signal is not influenced by a wobble period, the header mask signal can be used as the first header mask signal.

Meanwhile, when the header mask mode J_mode is switched to the "high" state, the microcomputer 406 generates a kick pulse toward a track jump direction and applies it to a tracking actuator in step 503. When the kick pulse is generated in step 503, the speed of the tracking actuator increases, and an objective lens of the tracking actuator is pushed toward the track jump direction by acceleration. At this time, a TZC signal is detected.

Next, a brake pulse is applied to the tracking actuator at a rising edge of the TZC signal for a predetermined brake time to decelerate the tracking actuator in step 504. When the previously set brake time has elapsed, a tracking servo and a sled servo are turned on in step 505.

When the tracking servo and the sled servo are turned on step 505, it is determined whether a target track is reached in step 506. When it is determined that the target track is not reached, the progress returns to the step 503, and the above processes are repeated. When it is determined that the target track is reached, it is determined whether a PLL-wobble signal is normally and stably detected in step 507.

When it is determined that the PLL-wobble signal is not normally detected in step 507, a header mask signal H/M and a focus error signal FE are held using the first header mask signal until the PLL-wobble signal is normally detected. When the PLL-wobble signal is normally detected after a predetermined time has elapsed, the header mask mode J_mode is toggled from a "high" state to a "low" state in step 508. In other words, the header mask mode J_mode is switched to the "low" state, and the switched header mask mode J_mode is output to the H/M controller 410 in order to use a header mask signal generated by the second H/M generator 409. In another example of step 508, an enough time to compensate for elongation of the PLL-wobble signal is previously set, and a header mask mode J_mode is switched to a "low" state after the previously set time has elapsed.

Accordingly, the present invention can exactly generate a header mask signal in a header area after the track jump is completed, as shown in FIG. 11(c). In other words, a header coming first after the track jump can be stably masked, thereby preventing a tracking error from being greater in a header area, as shown in FIG. 11(a). Consequently, track slippage or an unstable track servo can be prevented, thereby allowing data to be recorded or reproduced in a stable servo.

Meanwhile, in the second embodiment of the present invention, the microcomputer 406 may check a falling point of the header mask signal output from the H/M controller 410 before performing a track jump, that is, before outputting a track jump control command to the servo controller 405 for the purpose of making a TZC signal not to be influenced by a header during the track jump. After a track jump command is input, when a falling edge of the header mask signal is not detected, the track jump control command is held until the falling edge is detected. When the falling edge of the header mask signal is detected, the microcomputer 406 outputs the track jump control command to the servo controller 405, thereby starting the track jump.

In addition, to prevent a PLL-wobble signal from elongating, a wobble PLL in which an actual wobble signal is subjected to a PLL may be inhibited, and a PLL-wobble signal may be held to a value obtained before the track jump is performed, during the track jump. For this operation, when a track jump command is input, the microcomputer 406 outputs a hold signal Hold to the wobble PLL unit 408, and the wobble PLL unit 408 inhibits or resumes a wobble PLL according to the hold signal Hold. When a header area is detected during a normal servo, that is, during normal recording/reproducing, the microcomputer 406 also outputs the hold signal Hold to the wobble PLL unit 408.

Accordingly, the wobble PLL unit 408 outputs the PLL-wobble signal, in which a wobble signal recorded on an actual disc is subjected to the PLL, to the second H/M generator 409. During this operation, when the hold signal Hold is received from the microcomputer 406, the wobble PLL unit 208 stops the PLL of the wobble signal. Then, the wobble PLL unit 408 outputs a PLL-wobble signal which is held to a previous value, that is, a value obtained before reaching a header area in the case of a normal servo or a value obtained before performing the track jump, to the second H/M signal generator 409.

As described above, in a track jump method according to the present invention, once a track jump command is input, a track jump operation is held until a falling edge of a header mask signal is detected. The track jump starts at the falling edge of the header mask signal and ends before a rising edge of the header mask signal so that a TZC signal is not influenced by a header during the track jump. Therefore, the track jump can be exactly and stably performed. In particular, when the track jump command is input, a PLL of a wobble signal is inhibited, and a PLL-wobble signal is held to a previous value obtained before the track jump is performed, during the track jump. Therefore, a header coming first after the track jump is completed can be stably masked, thereby preventing a system from being unstable due to a header during the track jump. In addition, once the track jump command is input, a header mask signal is generated using a read channel signal which is not influenced by a wobble period, until a wobble signal becomes stable after a track jump. During a normal servo, a header mask signal is generated using a PLL-wobble signal to mask a header area. Therefore, a header area coming first after the track jump is completed can be stably masked, thereby preventing a system from being unstable due to a header during the track jump.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A track jump method for an optical recording medium on which a plurality of header areas having different phases are disposed between data areas, the method comprising:
   (a) checking whether a current location is the end of a header area when a track jump command is received; and
   (b) starting the track jump when the current location is the end of the header area, wherein a header mask signal masking the header area is generated using a read channel 1 signal or read channel 2 signal irrespective of a wobble signal during a track jump and after completion of the track jump the header mask signal is generated using a phase locked loop-wobble signal.

2. A method of claim 1, wherein the track jump is completed before a rising edge of the header mask signal.

3. A track jump method for an optical recording medium on which a plurality of header areas having different phases are disposed between data areas, the method comprising:
   (a) checking whether a current location is the end of a header area when a track jump command is received; and
   (b) determining whether to start the track jump based on the checking step (a), wherein a header mask signal masking the header area is generated using a read channel 1 signal or read channel 2 signal irrespective of a wobble signal during a track jump and after completion of the track jump the header mask signal is generated using a phase locked loop-wobble signal.

4. An apparatus for controlling a track jump for an optical recording medium, the apparatus comprising:

a pickup; and a controller to check whether a current location of the pickup is an end of a header area, wherein a header mask signal masking the header area is generated using a read channel 1 signal or read channel 2 signal irrespective of a wobble signal during a track jump and after completion of the track jump the header mask signal is generated using a phase locked loop-wobble signal.

5. A track jump method for an optical recording medium on which a plurality of header areas having different phase are disposed between data areas, the method comprising:

(a) masking the header areas using a first header mask signal generated by a reflected signal irrespective of a wobble signal and indicating the header areas of the optical recording medium during the track jump;

(b) masking the header areas using a second header mask signal generated by the wobble signal during normal recording/reproducing.

6. A method of claim 5, further comprising:

(c) checking whether a current location is the end of the header area by a falling edge of a header mask signal when a track jump command is received; and (c) starting the track jump when the current location is the end of the header area.

7. A method of claim 5, wherein the first header mask signal is generated by slicing a sum of or a difference between optical reflected signals from the optical recording medium at a certain level.

8. A method of claim 5, wherein the second header mask signal is generated by counting wobble signals subjected to the phase locked loop.

9. A method of claim 5, further comprising the step of masking the header areas using the first header mask signal until the wobble signal is normally detected after the track jump is completed.

* * * * *